United States Patent
Rao et al.

(10) Patent No.: US 7,983,456 B2
(45) Date of Patent: Jul. 19, 2011

(54) SPECKLE ADAPTIVE MEDICAL IMAGE PROCESSING

(75) Inventors: Bimba Rao, San Jose, CA (US);
Danhua Zhao, San Jose, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 886 days.

(21) Appl. No.: 11/233,743

(22) Filed: Sep. 23, 2005

(65) Prior Publication Data

US 2007/0071292 A1    Mar. 29, 2007

(51) Int. Cl.
*G06K 9/00* (2006.01)

(52) U.S. Cl. ........ 382/128; 382/130; 382/131; 382/132; 382/254; 600/442; 600/443; 600/437

(58) Field of Classification Search .......... 382/128, 382/130–132, 254, 275; 600/407, 442, 443, 600/438
See application file for complete search history.

(56) References Cited

U.S. PATENT DOCUMENTS

| | | | |
|---|---|---|---|
| 4,982,339 A | | 1/1991 | Insana et al. |
| 5,409,007 A | | 4/1995 | Saunders et al. |
| 5,479,926 A | | 1/1996 | Ustuner et al. |
| 5,748,311 A | | 5/1998 | Hamann et al. |
| 5,841,889 A | * | 11/1998 | Seyed-Bolorforosh ....... 382/128 |
| 6,318,179 B1 | | 11/2001 | Hamilton et al. |
| 6,398,733 B1 | * | 6/2002 | Simopoulos et al. ......... 600/443 |
| 6,481,268 B1 | | 11/2002 | Povey et al. |
| 6,579,238 B1 | * | 6/2003 | Simopoulos et al. ......... 600/443 |
| 6,698,276 B2 | | 3/2004 | Povey et al. |
| 2003/0013965 A1 | * | 1/2003 | Quistgaard et al. ........... 600/446 |
| 2003/0142288 A1 | * | 7/2003 | Kinrot et al. .................... 356/28 |
| 2005/0168445 A1 | * | 8/2005 | Piot et al. ....................... 345/163 |
| 2005/0190157 A1 | * | 9/2005 | Oliver et al. .................. 345/166 |
| 2005/0259267 A1 | * | 11/2005 | Carlisle et al. ................ 356/498 |

OTHER PUBLICATIONS

"Fundamental Correlation Lengths of Coherent Speckle in Medical Ultrasonic Images," by Robert F. Wagner et al.; IEEE Transactions on Ultrasonics, Ferroelectrics and Frequency Control, vol. 35, No. 1, Jan. 1988; pp. 34-44.

"Statistics of Speckle in Ultrasound B-Scans," by Robert F. Wagner et al.; IEEE Transactions on Sonics and Ultrasonics, vol. 30, No. 3; 1983; pp. 156-163.

* cited by examiner

*Primary Examiner* — Vikkram Bali
*Assistant Examiner* — Julian D Brooks

(57) ABSTRACT

Image processing adapts to speckle. Speckle is identified from signal transitions. For example, peaks, valleys or mean crossings of image signals as a function of space or spatial location are identified. A speckle characteristic, such as speckle size, is estimated from the signal transitions. The estimation may be limited to soft tissue regions to reduce the effects of specular targets and noise on speckle estimation. The speckle is estimated for local regions or an entire image. By estimating speckle for local regions, image processing may account adaptively for regional variation in speckle size.

22 Claims, 1 Drawing Sheet

SPECKLE ADAPTIVE MEDICAL IMAGE PROCESSING

BACKGROUND

This present invention relates to medical imaging. In particular, image processing adapts to speckle characteristics.

Scanning to generate medical images of a patient may cause speckle. Speckle results from reflections from structure smaller than the resolution of the scanning. Speckle size varies based on operation conditions, such as system settings and patient anatomy. Speckle appears in associated images as noise.

In medical diagnostic ultrasound imaging, filters or other processes may reduce or eliminate speckle information after acquisition and beamforming. Frequency and spatial compounding are relatively simple approaches. In more complicated approaches, speckle size is estimated for a given image from correlation length measurement or spectrum analysis. However, these computationally complex measurements may provide inappropriate or inaccurate results for different image regions.

BRIEF SUMMARY

By way of introduction, the preferred embodiments described below include methods, instructions, computer readable media and systems for speckle adaptive medical image processing. Speckle is identified from signal transitions. For example, peaks, valleys or mean crossings of image signals as a function of space or spatial location are identified. A speckle characteristic, such as speckle size, is estimated from the signal transitions. The estimation may be limited to soft tissue regions to reduce the effects of non-specular targets on speckle estimation. The speckle is estimated for local regions or an entire image. By estimating speckle for local regions, image processing may account adaptively for regional variation in speckle size.

In a first aspect, a method is provided for speckle adaptive medical image processing. At least one spatial transition is identified from image data. A speckle characteristic is estimated as a function of at least one spatial transition.

In a second aspect, a computer readable storage medium has stored therein data representing instructions executable by a programmed processor for speckle adaptive medical image processing. The instructions are for identifying in image data spatial amplitude changes, and determining a speckle size as a function of the spatial amplitude changes.

In a third aspect, a method is provided for speckle adaptive medical image processing. A processor extracts soft tissue regions from image data. A speckle characteristic is estimated as a function of the soft tissue regions.

In a fourth aspect, a method is provided for speckle adaptive medical image processing. A first speckle size is estimated for a first region of a medical image. A second speckle size is estimated for a second region of the medical image. The first speckle size is different from the second speckle size, and the first region is different from the second region.

The present invention is defined by the following claims, and nothing in this section should be taken as a limitation on those claims. Further aspects and advantages of the invention are discussed below in conjunction with the preferred embodiments and may be later claimed in combination or independently.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Adaptive image processing uses real-time speckle size estimation. Speckle size is locally estimated by information from signal transitions (e.g., peaks, valleys, or local mean crossings) in a soft tissue portion of the image.

Figure 1:
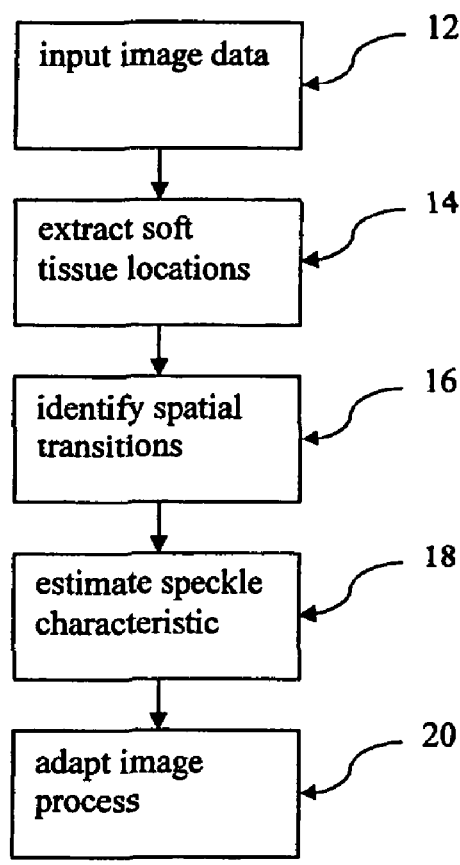
FIG. 1 is a flow chart diagram of one embodiment of a method for speckle adaptive image processing.

FIG. 1 shows one embodiment of a method for speckle adaptive medical image processing. The method is implemented by the system of FIG. 3 or a different system. Additional, different or fewer acts may be provided. For example, local speckle estimation, estimation based on spatial signal transitions or tissue extraction is performed alone or in any combination of two or three of these features. The acts are performed in the order shown, but other orders may be used.

In act 12, image data is input. Image data is data responsive to a scan of a one, two or three dimensional region. For medical diagnosis, the image data represents a region of a patient. Any modality for imaging may be used, such as ultrasound, optical imaging or other now known or later developed medical imaging mode. The image data is from any stage in the processing path whether or not the data has been used to generate a display. For ultrasound, the image data may be beamformed data prior to detection, detected data prior to scan conversion, scan converted data prior to color or gray scale mapping or RGB/YUV data for display. The image data is used for later generation of an image representing the scanned region or was previously used to generate the image. A medical image indicates image data using medical scanning.

In one embodiment, the image data is detected ultrasound data. Any detection may be used, such as intensity (e.g., B-mode detection), Doppler velocity or Doppler energy.

For real-time processing, the image data is substantially continuously acquired. For post acquisition processing, stored image data is retrieved and processed. A single image (e.g., frame of data) or a sequence of images are used.

In act 14, soft tissue regions are extracted form image data. At least one region represented by the image data and associated with soft tissue is located. Soft tissue includes organs, muscle, fat, skin or other tissues. Speckle more likely occurs for soft tissue regions. Fluid regions, such as the interior of a vessel or heart, may have little speckle or not be of interest for higher resolution imaging by speckle adaptive processes. A single scan for a one, two or three dimensional region may include soft tissue, fluid, bone or other regions. By extracting soft tissue regions, the identification and estimation acts 16 and 18 are performed for soft tissue regions and are not performed for other regions. The image data from the other regions is not used for the speckle characteristic estimation, so does not alter estimation of speckle characteristics for soft tissue regions. Alternatively, image data from other regions is used for estimating speckle characteristics for those regions without image data from soft tissue regions. In another alternative embodiment, soft tissue regions are not distinguished from other regions for speckle estimation.

The identification of soft tissue regions is performed with a processor, such as in an automatic process, but may be input manually. The variance of the image data is calculated, such as determining variance as a function of spatial location or time. The variance for the different spatial locations is normalized by the dynamic range of the imaging system or image data. Soft tissue is identified as being within a mid-range of the normalized values. High and low values are more likely associated with other regions. In one embodiment, the variance is used to extract soft tissue regions as disclosed in U.S. Pat. No. 6,579,238, the disclosure of which is incorporated herein by reference. Other now known or later developed processes to extract soft tissue regions may be used. For example, an amplitude threshold is applied or a filter isolates soft tissue information. As another example, tissue associated with movement is extracted as soft tissue.

Any noise or undesired variance in the extraction of soft tissue regions is removed or reduced. The soft tissue regions may be contiguous. By applying a low pass filter to the identified locations, contiguous regions may be formed. Alternatively, filtering is not performed. The soft tissue regions include lines, areas and/or volumes. Different soft tissue regions may be separated from each other by other regions. A single contiguous soft tissue region may be extracted with no or some other adjacent or enclosed regions.

The image data may be aliased. For example, the image data is sampled coarsely relative to the speckle. Low or bandpass filtering of the image data with a null at about ½ the sampling frequency may remove or reduce the effects of aliasing. The filtered image data is used for generating a display and/or for estimation of the speckle characteristic.

In act 16, spatial transitions are identified from the image data. The spatial transitions are changes in B-mode ultrasound data or other image data as a function of spatial location. The identification is along at least one dimension, such as identifying spatial transitions along orthogonal directions throughout a two dimensional medical image. Multidimensional spatial transitions are identified in other embodiments. The identification is performed for the soft tissue regions. If soft tissue locations are separated by other regions, the identification may be performed separately for the different soft tissue locations.

Figure 2:
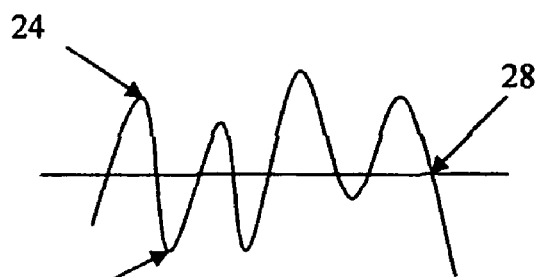
FIG. 2 is a graphical representation of signal transitions as a function of spatial location.

Spatial transitions include a peak, a valley, mean crossing, combinations thereof or other transitions as a function of location. FIG. 2 shows image data values as a function of location along one dimension. A plurality of peaks 24 and valleys 26 (i.e., minima) are shown. The horizontal line represents a mean value or a local mean. The crossing points 28 include negative and positive going crossings. As shown in FIG. 2, the local mean is for a larger area or extent, such as over 20 locations. In one embodiment, the local mean is over any contiguous soft tissue region. In another embodiment, the local mean is smaller, such as being over a nearest 5 locations in one, two or three dimensions. The local mean may be set to be about an expected speckle size. The expected speckle size may adapt based on system settings, such as based on settings of frequency, aperture size, depth or other parameters. The local mean is the same or different for a same location searched along different dimensions or angles.

In act 18, a speckle characteristic is estimated as a function of the spatial transitions. Speckle characteristics include size, variance, or other characteristics. The mean, median, percentile or other statistic of the characteristic may be used. For example, an absolute value, mean, median or percentile represent speckle size.

The speckle characteristic, such as size, is estimated as one value for an entire image (e.g., an average) or a plurality of values. The plurality of values each corresponds to the entire image or to different regions in the entire image. For example, speckle size is estimated locally. The estimation is performed separately for the same, smaller or larger regions as used for the local mean in identifying spatial transitions. The regions for estimation may overlap, but provide different, same or similar values for adjacent locations in a same frame of image data. The estimation is performed for soft tissue regions, such as along parallel lines through the soft tissue region. Distinct estimates with the same or different values are provided for different regions of a medical image.

Speckle size or other characteristic is calculated from the spatial transitions. The distance or mean (i.e., average) distance between consecutive peaks 24 and/or valleys 26 is the speckle size. The length, area or volume in the soft tissue region divided by the total number of extrema, such as peaks 24 and/or valleys 26, in each soft tissue region is the speckle size. For example, each soft tissue region corresponds to a contiguous line along one of two dimensions. A speckle size is estimated for each soft tissue line along each of the two dimensions. The distance or mean distance between adjacent mean-crossings 28 in a region is the speckle size. The length, area or volume of the region divided by the total number of mean-crossings 28 in a region is the speckle size. Combinations of these functions may be provided, such as averaging different speckle sizes for adjacent locations. Other now known or later developed functions for estimating a speckle characteristic as a function of spatial transitions may be used, such as a derivative or gradient based function.

A single speckle size value is provided for each location, region or entire image. More than one value may be provided, such as providing two or more speckle size values corresponding to analysis or estimation along two or more spatial directions or corresponding to different speckle size calculations. Where multiple values are provided, the multiple values are averaged or combined or are maintained separately.

In act 20, image processing adapts as a function of the speckle characteristic. The image processing includes filters and/or enhancement processes. For example, an algorithm for edge enhancement in the image varies as a function of the speckle size. The edge enhancement is altered to exclude or minimize contribution from image data associated with the speckle size. As another example, the pass band of a low, high or band pass filter is set as a function of the speckle size. The pass band may be set to reduce or remove speckle information but maintain other higher or lower frequency data. The filter kernel adapts to smooth the speckle while minimizing reduction of other information, such as information with a greater spatial variation. In one embodiment, the contrast enhancement process disclosed in U.S. Pat. No. 5,479,926, the disclosure of which is incorporated herein by reference, adapts to the speckle size or other characteristic. For example, a nonlinear mapping or combination function is varied based on the speckle size to increase or decrease spatial resolution or contrast. Other image processes may adapt to the speckle characteristic.

The image processing adapts once for a sequence or use of a system with particular settings. Alternatively, the image processing adapts as a function of different images in a sequence or temporally from image to image. Alternatively or additionally, the image processing adapts differently within a same image. Where the speckle characteristic, such as size, is determined for different locations or regions, the image process adapts locally or for the different locations or regions. The image processing varies spatially as a function of any spatial variance in the speckle size. Where the image processing is directional, different speckle characteristics associated with the same directions may be used.

The adapted image processing applies to the image data used to estimate the speckle characteristic. A feedback loop applies the image processing to the same data. Alternatively, the image processing adapts based on the image data and is applied to subsequent image data. As each frame of image data is input, the speckle characteristic from a previous, such as the immediately previous, frame of image data is used in the image processing.

Figure 3:
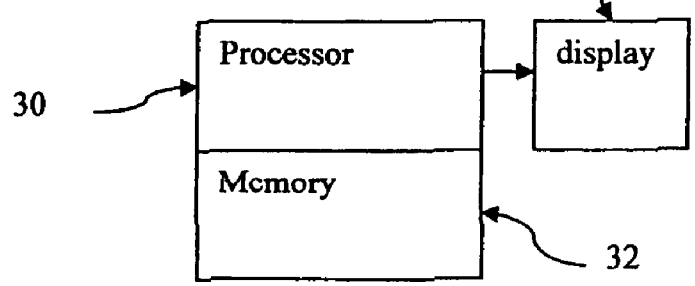
FIG. 3 is a block diagram of one embodiment of a system for speckle adaptive image processing.

FIG. 3 shows one embodiment of a system for speckle adaptive medical image processing. The system implements the method of FIG. 1 or other methods. The system includes a processor 30, a memory 32, and a display 34. Additional, different or fewer components may be provided. For example, a user input is provided for manual or assisted indication of tissue regions. As another example, the system is a medical diagnostic ultrasound imaging system that also includes a beamformer and a transducer for real-time acquisition and imaging. Other medical imaging systems may be used. In another embodiment, the system 60 is a personal computer, workstation, PACS station or other arrangement at a same location or distributed over a network for real-time or post acquisition imaging.

The processor 30 is a control processor, general processor, digital signal processor, application specific integrated circuit, field programmable gate array, network, server, group of processors, data path, combinations thereof or other now known or later developed device for estimating a speckle characteristic and adapting an image process as a function of the estimated speckle characteristic. For example, the processor 30 or a data path of processors including the processor 30 extracts soft tissue regions so that subsequent identifying and estimating are performed as a function of the soft tissue regions. Spatial amplitude changes are identified in image data, such as identifying a peak, a valley, a mean crossing or combinations thereof in the image data as a function of space along at least one dimension. Speckle size or other characteristic is determined as a function of the spatial amplitude changes. Different speckle sizes may be determined for at least two different regions of an image. Image data is processed as a function of the speckle size.

The processor 30 operates pursuant to instructions stored in the memory 32 or another memory. The processor 30 is programmed for estimating a speckle value or values for an image and/or extracting tissue regions.

The memory 32 is a computer readable storage media. The instructions for implementing the processes, methods and/or techniques discussed above are provided on the computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, filmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

The memory 32 may alternatively or additionally store medical image data for generating images. The medical data is the scan data prior to navigation or image processing, but may alternatively or additionally include data at different stages of processing.

The display 34 is a CRT, LCD, projector, plasma, or other display for displaying one or two dimensional images, three dimensional representations, graphics for the path, regions of interest or other information.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for speckle adaptive medical image processing, the method comprising:
    obtaining image data comprising intensities as a function of spatial location along at least one dimension in an image plane, the intensities as a function of spatial location providing a waveform;
    identifying, in the waveform of the intensities as a function of spatial location, at least two spatial transitions in variation of the intensities;
    calculating a spatial distance between the at least two spatial transitions of the waveform of intensity values as a function of spatial location along the at least one dimension in the image plane;
    estimating a value quantifying a speckle characteristic of at least a spatial region represented by the image data, the value calculated as a function of the spatial distance on the image plane between the at least two spatial transitions; and
    image processing the image data or subsequent image data as a function of the value quantifying the speckle characteristic, the image processing operating differently when the value differs.

2. The method of claim 1 wherein the at least two spatial transitions comprise consecutive peaks, consecutive valleys, or a peak and an adjacent valley in the spatial region.

3. The method of claim 1 wherein identifying the at least two-spatial transitions comprises identifying at least consecutive mean crossings in the image data.

4. The method of claim 1 wherein the speckle characteristic comprises a speckle size.

5. The method of claim 4 wherein the speckle size comprises an average speckle size.

6. The method of claim 4 wherein the speckle size comprises a speckle size for each of a plurality local regions for a same image.

7. The method of claim 1 wherein identifying the at least two spatial transitions comprises identifying from B-mode ultrasound data.

8. The method of claim 1 further comprising:
    locating at least one region represented by the image data and associated with soft tissue;
    wherein the identifying and estimating are performed for the at least one region and are not performed for another region.

9. The method of claim 2, wherein the value is calculated as a mean of the spatial distance on the image plane between the at least two spatial transitions.

10. The method of claim 6 wherein image processing the image data or subsequent image data is spatially variant as a function of any spatial variance in the speckle size.

11. The method of claim 1 wherein identifying the at least two spatial transitions comprises identifying along at least one dimension.

12. In a computer readable storage medium having stored therein data representing instructions executable by a programmed processor for speckle adaptive medical image processing, the storage medium comprising instructions for:

obtaining image data comprising intensities as a function of spatial location along at least one dimension in an image plane, the intensities as a function of spatial location providing a waveform;

identifying, in the waveform of the intensities as a function of spatial location, spatial amplitude changes in variation of amplitude of the intensities;

calculating a spatial distance between the spatial amplitude changes of the waveform of intensity values as a function of spatial location along the at least one dimension in the image plane;

determining a value quantifying speckle size for at least a spatially distributed region represented by the image data, the value calculated as a function of a spatial distance in the image plane between the spatial amplitude changes; and image processing the image data or subsequent image data adaptively depending on the value quantifying the speckle size.

13. The instructions of claim 12 wherein the spatial amplitude changes comprise at least two of a peak, a valley, a mean crossing or combinations thereof in the image data as a function of space along at least one dimension.

14. The instructions of claim 12 further comprising:
extracting soft tissue regions;
wherein the identifying and determining are performed as a function of the soft tissue regions.

15. The instructions of claim 12 wherein the value is calculated as a mean of the spatial distance on the image plane between the at least two spatial amplitude changes.

16. The instructions of claim 12 wherein determining comprises determining different values quantifying speckle size for at least two different regions of an image.

17. A method for speckle adaptive medical image processing, the method comprising:
extracting with a processor soft tissue regions from image data;

estimating a value quantifying a speckle characteristic for at least one of the soft tissue regions, the value calculated from a distance between spatial locations represented by the image data, calculating the distance between the spatial locations at which a variation in amplitude of the image data occurs and is identified within the at least one of the soft tissue regions, the variations being peaks, valleys or local mean crossings of the amplitude of the image data as a function of space in the image plane; and image processing the image data or subsequent image data as a function of the value quantifying the speckle characteristic.

18. The method of claim 17 further comprising:
identifying from the image data at least two spatial transitions in one of the soft tissue regions;
wherein estimating comprises estimating speckle size as a function of the distance between the at least two spatial transitions.

19. The method of claim 17 wherein the speckle characteristic comprises different speckle sizes for different local regions for a same image.

20. A method for speckle adaptive medical image processing, the method comprising:
estimating a first value quantifying a first speckle size for a first region of a medical image;
estimating a second value quantifying a second speckle size for a second region of the medical image, the first value different than the second value and the first region different than the second region, the first value and second value calculated based on variation in amplitude of image data as function of spatial location within the first and second regions, the first and second values calculated as a function of a spatial distance, calculating the spatial distance as a difference between spatial locations for peaks, valleys or local mean crossings of the variation of the amplitude of the image data along at least one dimension in the medical image; and
image processing the medical image or subsequent medical image as adaptively depending on the first value and the second value.

21. The method of claim 20 further comprising:
extracting with a processor soft tissue regions from the medical image; wherein the first and second regions are soft tissue regions.

22. The method of claim 20 further comprising:
identifying from the medical image at least two spatial transitions comprising the speckle amplitude extrema;
wherein estimating comprises estimating as a function of a spatial distance on an image plane between the at least two spatial transitions.

* * * * *